Oct. 10, 1939.  R. GUSTAFSON  2,175,290
CLUTCH STRUCTURE
Original Filed July 23, 1936   2 Sheets-Sheet 1
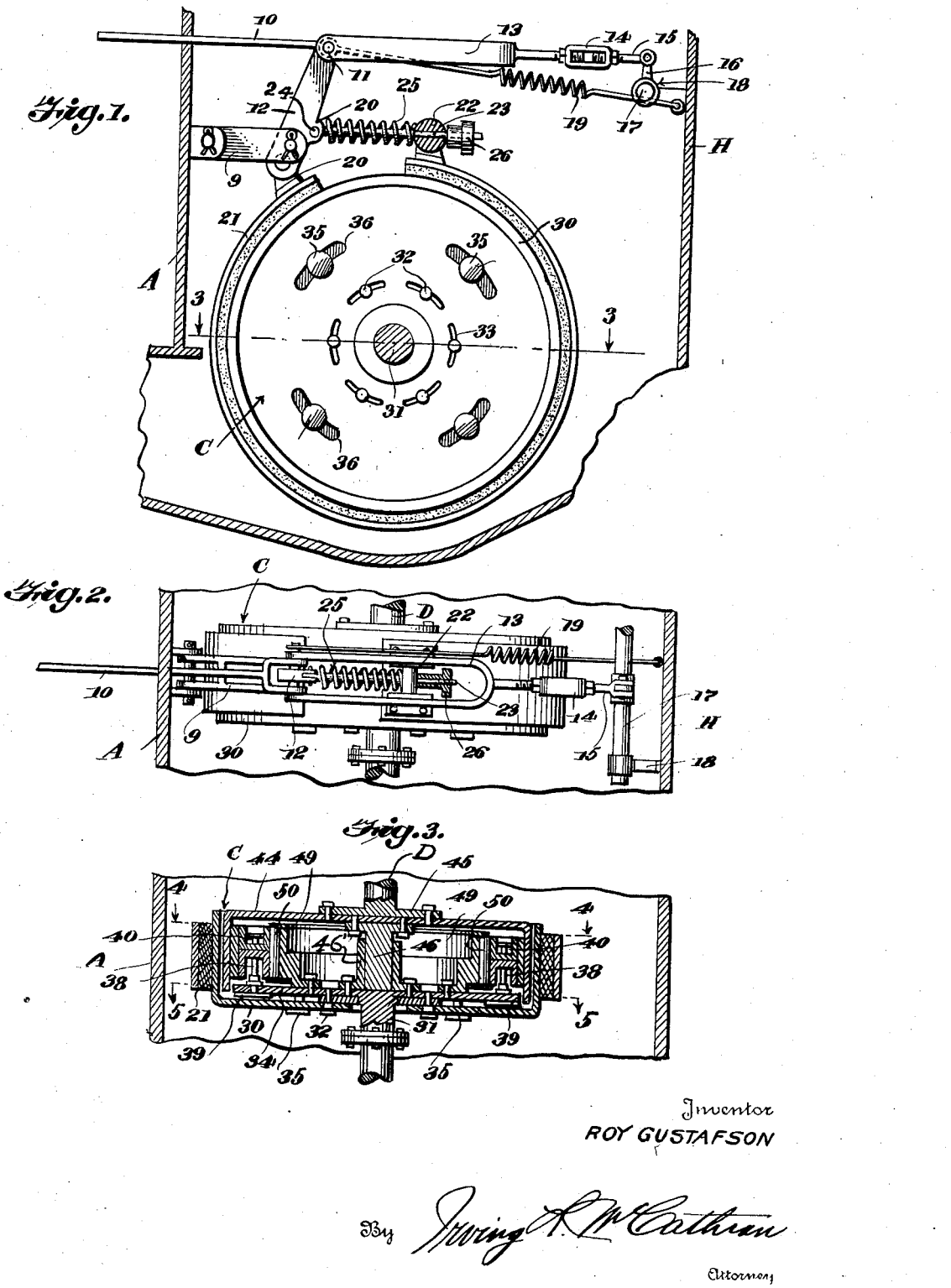
Inventor
ROY GUSTAFSON Oct. 10, 1939.   R. GUSTAFSON   2,175,290
CLUTCH STRUCTURE
Original Filed July 23, 1936   2 Sheets-Sheet 2
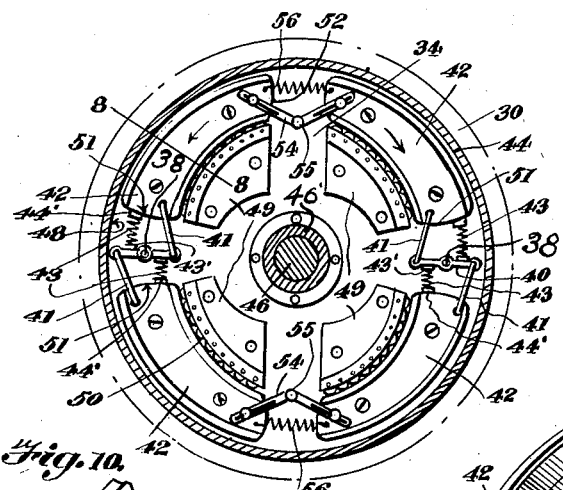
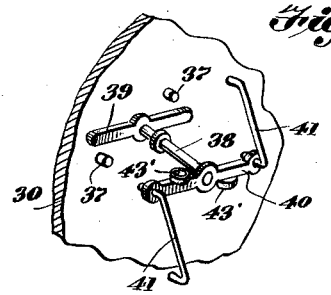
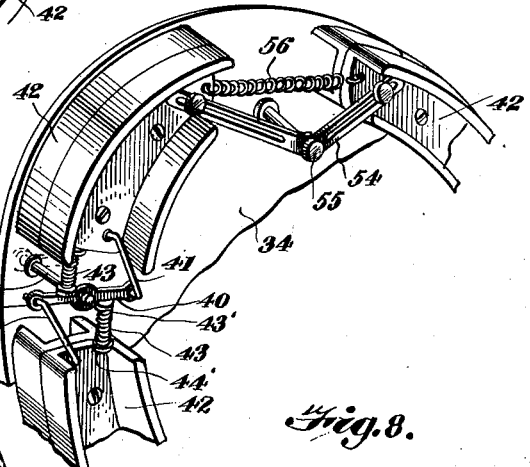
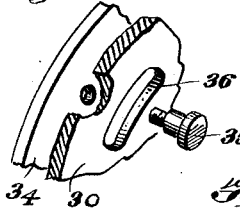
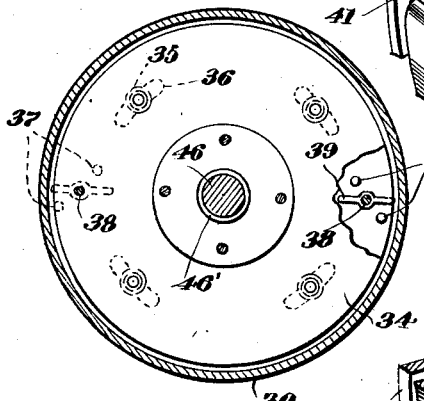
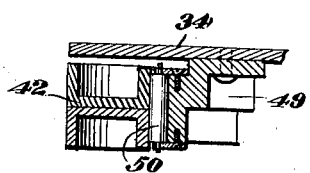
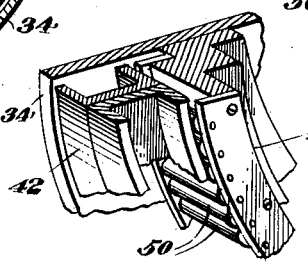
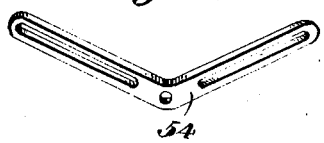
Inventor
ROY GUSTAFSON
By Irving H. M. Cathran
Attorney Patented Oct. 10, 1939

2,175,290

UNITED STATES PATENT OFFICE 2,175,290

CLUTCH STRUCTURE

Roy Gustafson, Fields Landing, Calif.

Original application July 23, 1936, Serial No. 92,197. Divided and this application April 6, 1937, Serial No. 135,313

8 Claims. (Cl. 192—36)

This invention relates to a clutch structure and has for one of its objects the production of a simple and efficient means for clamping a clutch shoe or clutch shoes in a gripping position upon a drum through a wedging action produced in co-operation with wedge-shaped supporting members.

Another object of this invention is the production of an efficient clutch drum mechanism which is so constructed as to permit the parts thereof to operate in oil and thereby obtain a cushioning grip of the shoes upon the drum when applied and ease the strain upon the axle and other associated mechanism.

This application constitutes a divisional application of my application relating to Clutch steering mechanism for tractors, filed July 23, 1936, Serial Number 92,197, and is also a continuation in part of my application relating to Clutch steering mechanism for tractors and other vehicles, filed November 30, 1935, Serial Number 52,417.

Other objects and advantages of this invention will appear throughout the following specification and claims.

In the drawings:

Figure 1 is a side elevation of the clutch unit, illustrating also the operating means therefor, the supporting axle and certain other associated parts being shown in section;

Figure 2 is a top plan view of the clutch unit;

Figure 3 is a horizontal sectional view taken on line 3—3 of Figure 1;

Figure 4 is a sectional view taken on line 4—4 of Figure 3;

Figure 5 is a sectional view taken on line 5—5 of Figure 3;

Figure 6 is a fragmentary perspective view of a portion of the clutch unit showing the manner of connecting the shoes or clutching segments;

Figure 7 is a perspective view of one of the trigger fingers and one of the clutching segment shifting arms, a portion of the supporting disc plate being shown in section;

Figure 8 is a section taken on line 8—8 of Figure 4;

Figure 9 is a sectional perspective view through a portion of the supporting disc plate, one of the clutching segments and one of the wedge plates;

Figure 10 is a fragmentary sectional view of a portion of the clutch drum, and clutching plate showing one of the headed bolts, the parts being drawn apart;

Figure 11 is a perspective view of one of the bell crank levers used in the clutch drum.

By referring to the drawings, it will be seen that 10 designates an operating rod which is pivotally secured, as at 11, to the upper end of a lever 12. The lever 12 is pivotally supported upon a bracket or link 9 carried by a support A. A yoke 13 is pivotally connected to the lever 12, as at 11. The rear end of the yoke 13 is connected to a turnbuckle 14, which in turn is connected to a link 15 and a rocker arm 16 is carried by the supporting rod 17 journaled, as at 18, to a housing H. A coil spring 19 is connected to the upper end of the lever 12 and also to the housing H to assist the lever 12 in returning to its rearwardly swung position after the pull on the rod 10 is released. The lever 12 is pivotally connected at its lower end to one end of the band 21, by means of a connection 20, and the opposite end of the band 21 carries a journal 22 through which a rod 23 extends. The opposite end of the rod 23 is connected, as at 24, to the lever 12 above the bracket 9, and a coil spring 25 is carried by the rod 23 to spread the ends of the band 21 apart or free the same when the band 21 is disengaged from the clutch drum of the clutch mechanism C hereinafter described. An adjusting nut 26 is upon the outer end of the rod 23 to adjust the band 21. The throw of the lever 12 may also be adjusted by means of the turnbuckle 14.

The clutch mechanism C comprises an outer drum 30 which is carried by a section 31 of the driving shaft D and is mounted within thereon by means of a plurality of headed bolts 32 which are in threaded engagement with their supports or secured in any desired manner and the outer ends of the bolts 32 pass through the arcuate slots 33 formed in the web of the drum 30. A disc plate 34 is anchored to the section 31 of the shaft D and is mounted within the outer drum 30, as shown in Figure 3. The headed bolts 32 also engage the disc plate 34, as shown. The plate 34 carries additional headed bolts 35 which are threaded into their supports and have outer ends extending through the arcuate slots 36 in the web of the drum 30 to anchor the disc 34 and outer drum 30 in assembled relation, but at the same time allowing relative movement between the outer drum 30 and the disc plate 34. A plurality of threaded studs 37 are arranged in staggered relation in diametrically opposite positions near the periphery of the outer drum 30 and upon the inner face of the drum, as shown in Figure 7. Trigger shafts 38 are mounted to extend between the respective studs 37 of each group, and these trigger shafts 38 are carried by and extend at right angles to the face of the disc plate 34, as shown in this figure and in Figures 4 and 6. Trigger fingers 39 are carried by trigger shafts 38 and extend between the respective studs 37 of each group. These fingers 39 are adapted to normally remain out of contact with studs 37. As the disc plate 34 oscillates with respect to the outer drum 30 when the band 21 is applied in gripping relation to the outer drum 30, the trigger shafts 38 will be rotated, the arms 40 carried by the inner ends of the trigger rods 38 will be swung, pulling upon the links 41 and causing the wedge-shaped clutching segments 42 to be moved in the direction of the arrows shown in Figure 4 to disengage the shoe 42. Suitable expansion springs 43 are carried by clutching segments or shoes 42 to exert pressure against the inner arms 40 in their normal engaged position, thereby keeping shoes 42 against drum 44 in a normal engaged position. The ends of the expansion springs 43 may be engaged by suitable plates such as abutments 43' and 44', such as is shown in the drawings. I preferably employ four clutching segments or shoes 42 which are preferably arranged in pairs having the large ends of the segments connected to the links 41, as shown. These clutching segments or shoes 42 are arranged in circular formation within the inner drum 44, as shown in Figure 4, which inner drum is adapted to be fitted within the outer drum 30 and is carried by the flange 45 at the end of the driving axle D. A pilot stub shaft 46 is carried by the inner face of the inner drum 44. The clutching segments or shoes 42 are mounted to engage the marginal rim of the inner face 48 of the inner drum 44 and are preferably formed of abutting sections which are substantially U-shaped in cross section and bolted or secured together in any suitable or desired manner to simulate an I-beam structure in cross-section as shown in Figure 8. In this way, a relatively wide gripping face will be produced for each clutching segment or shoe 42. The pilot stub shaft 46 is journaled in the pilot bearing 46' carried by the inner face of the disc plate 34 as shown in Figures 3, 4 and 5. This will allow the inner drum 44 and the shaft D to freely rotate when the clutch is disengaged. Because of this structure the unit may be easily removed for repair or replacements which may be made.

In order to properly support the shoes 42, I provide guide or wedge plates 49 which are secured to the inner face of the disc 34 radially inwardly of the clutching segments or shoes 42, as shown in Figure 4. These guide plates 49 are provided preferably with roller bearings 50 which engage the inner faces of the clutching segments or shoes 42, and as the clutching segments or shoes 42 of each pair are spread apart in the opposite direction of the arrows shown in Figure 4, the shoes 42 will be brought into wedging engagement with the inner face 48 of the inner drum 44 due to the wedge-shaped formation of the shoes 42 and the sliding movement of the shoes over the rollers 50 which are carried by the guide plates 49. As shown, the guide plates 49 are closer to the drum 44 adjacent the smaller ends 52 of the shoes 42 than at the larger ends 51 of said shoes. The smaller ends of the shoes 42 of one pair are connected to the bell crank slotted levers 54, which levers are pivoted, as at 55, to the plate 34. Springs 56 are preferably employed to normally pull the outer ends 52 of the shoes of the clutching segments 42 towards each other, the shoes 42 normally being engaged tightly in the drum 44 except when the parts are operated to disengage same. The springs 43 and 56 co-operate to hold the shoes in wedging engagement with the wedge plates 49, and the rotatable frictional force of the drum 44 against the lining of the tapered shoes 42 in either direction will cause two of the shoes to ride up on the wedge plates 49 for firm frictional engagement with the rim of the drum 44. The bell crank levers 54 will cause the adjoining pair of shoes 42 to be pulled up on their wedge plates 49. This will cause the small ends of the pairs of shoes 42 to be drawn together. Consequently, the greater power applied to the drum 44 will cause a tighter wedging action of the shoes upon the drum 44. When the trigger fingers 39 are swung by the studs 37 to release the shoes, the frictional force of the drum 44 will tend to disengage the shoes 42.

It should be understood that the clutch unit C, as shown in Figure 4 will revolve as one unit when the clutch unit C is normally engaged and no pressure is applied to rod 10, the shaft 31 revolving at the same speed and same applied power as shaft D. The springs 56 pulling the small ends of the shoes toward each other and into wedging action and the tension of the expansion springs 43 pressing against the arms 40 will cause the links or push rods 41 to push against the shoes 42 to which they are connected. This action will cause the two uppermost shoes shown in Figure 4 to be forced apart and in wedging engagement with the rollers of the adjacent guide plates 49 and the inner face 48 of the drum 44. The bell crank levers 54 will also pull the adjoining shoes into gripping relation. The relative driving force of driving shaft D and drum 44 in either forward or backward motion will cause all of the shoes 42 to further wedge tighter against the drum 44.

Friction on one or any of the shoes 42 engaging the drum 44 will cause all of the shoes to be applied, since the shoes are all connected, as shown in Figure 4. The tension springs 56 will tend to pull the small ends of the adjoining sets of shoes toward each other. The bell crank levers 54 which are pivoted, as at 55, have slotted engagement with the small tapered ends of the adjoining pairs of shoes 42. The slotted ends of the levers 54 guide the shoes and prevent the displacement thereof and at the same time allow proper movement of the tapered ends of the shoes 42. The arms or levers 40 and links 41 at the same time push or force the large ends of the adjoining shoes 42 apart from, or away from, the action of the springs 43. All four of the shoes 42 will in this manner be forced into wedging engagement against the drum 44 and rollers of the guide plates 49. This will lock the two drums together.

By pulling the rod 10 forwardly, the lever 11 is swung in a forward direction and will swing upon its pivot 11 towards the left in Figure 1. This movement will pull the two ends of the band 21 toward each other and cause the same to be tightly drawn around the drum 30. The band 21 is not intended to hold the drum 30 stationary, as if such locking action occurred either the shaft 31 would be stopped or breakage of some part of the mechanism would occur. When the desired gripping action is accomplished, the plate 34 will slightly rotate with respect to the drum 30 and the studs 37 will engage and swing the trigger fingers 39, thereby rotating the shafts 38 and swinging the arms 40 to pull the adjoining shoes 42 which are connected to the arms 40, together at their large ends. In this way, the shoes will be moved to a disengaging position, or to a nonwedging position, when pressure from the springs 43 is overcome from the arms 40 due to the pull of the links 41. The friction of the drum 44 against the shoes 42 will tend to release the shoes 42. It should be noted that when one shoe 42 moves into a disengaging position, the fulcrum lever 54 through the medium of the slotted ends will move the adjacent shoes 42 to a disengaging position. The springs 56 and springs 43 will normally hold the shoes in a clutching or engaged position when pressure is released from the trigger fingers 39. The drum 30 and plate 34 may slightly oscillate with respect to each other, and the friction of the shoes upon the bands will tend to release the shoes 42 or engage the shoes 42, as the band 21 is released or engaged, as the case may be.

As stated previously, the parts may be so constructed as to work in oil within the housing H and for this purpose the band 21 should be constructed of suitable or desired oil resisting material for accomplishing the desired result, and at the same time allowing a cushioning grip for the brake or clutching mechanism.

What is claimed as new is:

1. A clutching mechanism of the class described comprising outer and inner interfitting drums, a disc plate mounted within the outer drum and carried thereby, means for connecting the outer drum and disc to permit said outer drum to oscillate upon the disc, a brake band for gripping the outer drum, wedge-shaped clutching segments slidably mounted within the inner drum, inclined guiding plates engaging said clutching segments for causing said clutching segments to produce a wedge-like gripping action upon said inner drum as said clutching segments are shifted in one direction, and means operable from said outer drum for shifting the position of said clutching segments.

2. A clutching mechanism of the class described comprising outer and inner interfitting drums, a disc plate mounted within the outer drum and carried thereby, means for connecting the outer drum and disc to permit said outer drum to oscillate upon the disc, a brake band for gripping the outer drum, wedge-shaped clutching segments slidably mounted within the inner drum, inclined guiding plates engaging said clutching segments for causing said clutching segments to produce a wedge-like gripping action upon said inner drum as said clutching segments are shifted in one direction, means operable from said outer drum for shifting the position of said clutching segments, and bearings carried by said guiding plates and engaging said clutching segments.

3. A clutching mechanism of the class described comprising outer and inner interfitting drums, a disc plate mounted within the outer drum and carried thereby, means for connecting the outer drum and disc to permit said outer drum to oscillate upon the disc, a brake band for gripping the outer drum, wedge-shaped clutching segments slidably mounted within the inner drum, inclined guiding plates engaging said clutching segments for causing said clutching segments to produce a wedge-like gripping action upon said inner drum as said clutching segments are shifted in one direction, means operable from said outer drum for shifting the position of said clutching segments, transversely extending roller bearings carried by the guide plates and engaging the inner faces of said clutching segments, and said clutching segments being arc-shaped throughout their length and conforming to the contour of the inner drum.

4. A clutching mechanism of the class described comprising outer and inner interfitting drums, a disc plate mounted within the outer drum and carried thereby, means for connecting the outer drum and disc to permit said outer drum to oscillate upon the disc, a brake band for gripping the outer drum, wedge-shaped clutching segments slidably mounted within the inner drum, inclined guiding plates engaging said clutching segments for causing said clutching segments to produce a wedge-like gripping action upon said inner drum as said clutching segments are shifted in one direction, the clutching segments being arranged in pairs, a trigger rod interposed between the segments of each pair and connected to the adjoining ends of each segment of each pair for spreading the segments of each pair apart as said trigger rod is rotated, fingers carried by each trigger rod, and tripping studs carried by the outer drum and engaging said fingers for rotating said trigger rods.

5. A clutching mechanism of the class described comprising outer and inner interfitting drums, a disc plate mounted within the outer drum and carried thereby, means for connecting the outer drum and disc to permit said outer drum to oscillate upon the disc, a brake band for gripping the outer drum, wedge-shaped clutching segments slidably mounted within the inner drum, inclined guiding plates engaging said clutching segments for causing said clutching segments to produce a wedge-like gripping action upon said inner drum as said clutching segments are shifted in one direction, the clutching segments being arranged in pairs, a trigger rod interposed between the segments of each pair and connected to the adjoining ends of each segment of each pair for spreading the segments of each pair apart as said trigger rod is rotated, fingers carried by each trigger rod, tripping studs carried by the outer drum and engaging said fingers for rotatating said trigger rods, said rods having projecting arms, and buffer springs carried by the adjoining ends of the segments of each pair and contacting with said arms.

6. A clutching mechanism of the class described comprising outer and inner interfitting drums, a disc plate mounted within the outer drum and carried thereby, means for connecting the outer drum and disc to permit said outer drum to oscillate upon the disc, a brake band for gripping the outer drum, wedge-shaped clutching segments slidably mounted within the inner drum, inclined guiding plates engaging said clutching segments for causing said clutching segments to produce a wedge-like gripping action upon said inner drum as said clutching segments are shifted in one direction, the clutching segments being arranged in pairs, a trigger rod interposed between the segments of each pair and connected to the adjoining ends of each segment of each pair for spreading the segments of each pair apart as said trigger rod is rotated, fingers carried by each trigger rod, tipping studs carried by the outer drum and engaging said fingers for rotating said trigger rods, said rods having projecting arms, buffer springs carried by the adjoining ends of the segments of each pair and contacting with said arms, slotted links pivotally connected at one end and engaging the outer ends of said clutching segments for connecting the outer ends of the respective pairs of segments, and springs interposed between said last mentioned outer ends.

7. A clutching mechanism of the class described comprising inner and outer drums fitting one within the other, a clutching band for checking rotation of said outer drum, a disc mounted within said drums, said outer drum having arcuate shaped slots, securing bolts passing through said slots for connecting the outer drum to said disc and allowing said outer drum and disc to oscillate with respect to each other, wedge-shaped shoes arranged in pairs and mounted within said inner drum, inclined guide plates engaging said shoes for causing said shoes to produce a wedge-like gripping action upon said inner drum when said shoes are moved in one direction, and means for shifting said shoes as said outer drum and disc respectively oscillate.

8. A clutching mechanism of the class described comprising outer and inner interfitting drums, mechanism supporting means mounted within said drums, means for connecting the outer drum and mechanism supporting means to permit said outer drum to oscillate relative to said mechanism supporting means, brake means for gripping one of said drums, wedging means slidable within the drums, means for moving the wedging means into gripping engagement with the other drum, and means operable from the adjoining drum for shifting the position of said wedging means to a disengaging position.

ROY GUSTAFSON.